US010084626B2

United States Patent
Van der Goes et al.

(10) Patent No.: US 10,084,626 B2
(45) Date of Patent: *Sep. 25, 2018

(54) WIRELESS TRANSMITTER USING A WIDEBRAND DIGITAL-TO-ANALOG CONVERTER FOR PROCESSING MULTIPLE CHANNELS IN A DIGITAL RADIO-FREQUENCY SIGNAL

(71) Applicant: Avago Technologies General IP (Singapore) Pte. Ltd., Singapore (SG)

(72) Inventors: Franciscus Maria Leonardus Van der Goes, Zeist (NL); David Christopher Garrett, Tustin, CA (US); Jan Mulder, Houten (NL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,226

(22) Filed: Oct. 30, 2017

(65) Prior Publication Data

US 2018/0054338 A1 Feb. 22, 2018

Related U.S. Application Data

(63) Continuation of application No. 15/061,248, filed on Mar. 4, 2016, now Pat. No. 9,806,924.

(60) Provisional application No. 62/298,067, filed on Feb. 22, 2016.

(51) Int. Cl.
*H04B 1/00* (2006.01)
*H04L 27/12* (2006.01)
*H04B 1/04* (2006.01)
*H04L 27/36* (2006.01)

(52) U.S. Cl.
CPC ............ *H04L 27/12* (2013.01); *H04B 1/0007* (2013.01); *H04B 1/0071* (2013.01); *H04B 1/04* (2013.01); *H04L 27/362* (2013.01)

(58) Field of Classification Search
CPC ......... H04L 27/12; H04L 27/362; H04B 1/04; H04B 1/0071; H04B 1/0007
See application file for complete search history.

(56) References Cited

U.S. PATENT DOCUMENTS

| 8,115,662 | B2 | 2/2012 | Anthony |
| 9,030,340 | B1 | 5/2015 | Waltari |
| 9,148,164 | B1 | 9/2015 | Schneider et al. |
| 2005/0238116 | A1 | 10/2005 | Monta |
| 2008/0013639 | A1 | 1/2008 | Rick et al. |
| 2009/0052556 | A1 | 2/2009 | Fernandez |

OTHER PUBLICATIONS

Non-Final Office Action for U.S. Appl. No. 15/061,248, dated Mar. 1, 2017, 14 pages.
Notice of Allowance for U.S. Appl. No. 15/061,248, dated Jun. 26, 2017, 9 pages.

*Primary Examiner* — Vineeta Panwalkar
(74) *Attorney, Agent, or Firm* — Foley & Lardner LLP

(57) ABSTRACT

A wireless transmitter processing chain includes digital radio frequency mixing circuitry to generate, in digital form, a representation of a transmit signal including multiple communication channels. From the digital representation, a wideband digital to analog converter creates the analog transmit signal that includes the communication channels. Individual mixers and filters follow, with mixing frequencies tuned to place the communication channels at the desired frequency centers.

20 Claims, 5 Drawing Sheets

WIRELESS TRANSMITTER USING A WIDEBAND DIGITAL-TO-ANALOG CONVERTER FOR PROCESSING MULTIPLE CHANNELS IN A DIGITAL RADIO-FREQUENCY SIGNAL

CROSS REFERENCE TO RELATED APPLICATIONS

This patent application is a continuation of and claims priority to and the benefit of U.S. patent application Ser. No. 15/061,248, filed Mar. 4, 2016, which claims the benefit of U.S. Provisional Application No. 62/298,067, filed Feb. 22, 2016, the contents of which are hereby incorporated herein by reference in their entirety for all purposes.

TECHNICAL FIELD

This disclosure relates to wireless transmitters. This disclosure also relates to a wireless transmitter using digital radio-frequency mixing with wideband digital to analog conversion.

BACKGROUND

Rapid advances in electronics and communication technologies, driven by immense customer demand, have resulted in the widespread adoption of electronic devices of every kind. These devices (e.g., smart phones, laptop computers, and WiFi gateways) commonly include wireless transceivers that are crucial in providing fundamental communication capabilities for the device. Improvements in the implementation of wireless transceivers will further enhance the capabilities of such devices.

DETAILED DESCRIPTION

Figure 1:
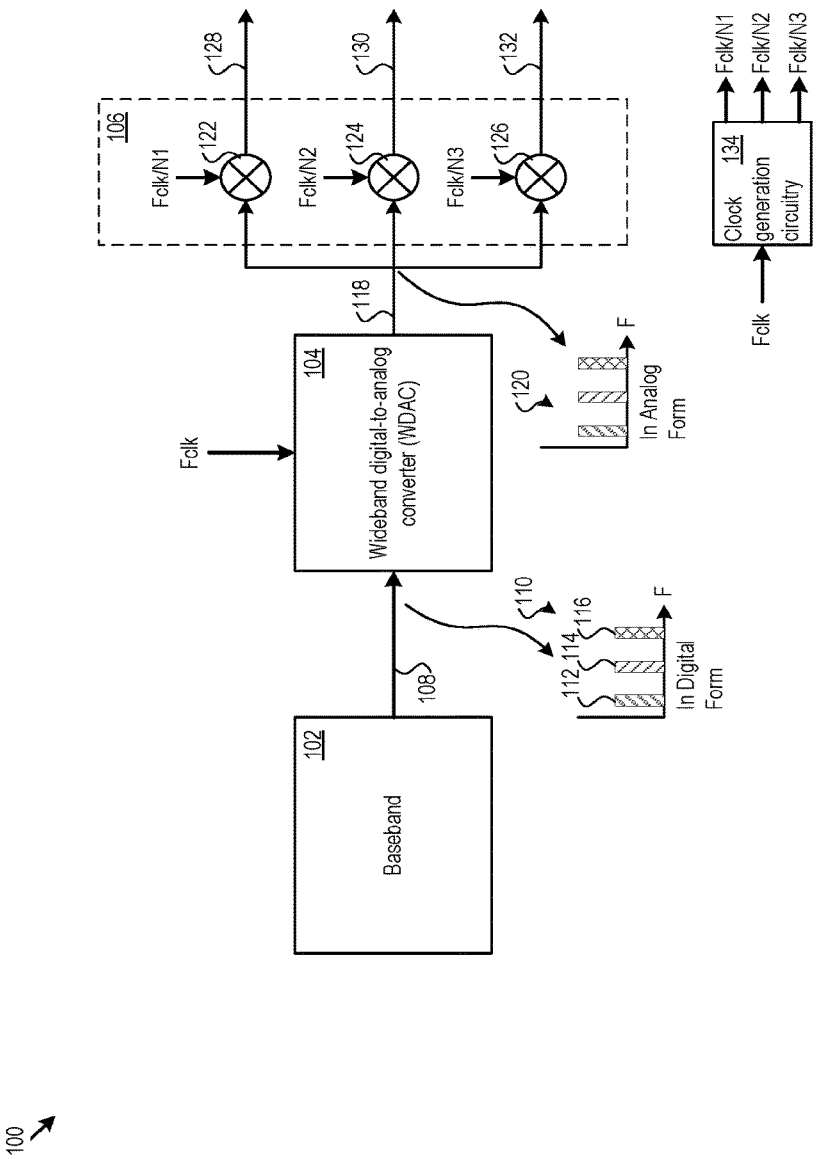
FIG. 1 shows wireless transmitter circuitry.
Figure 2:
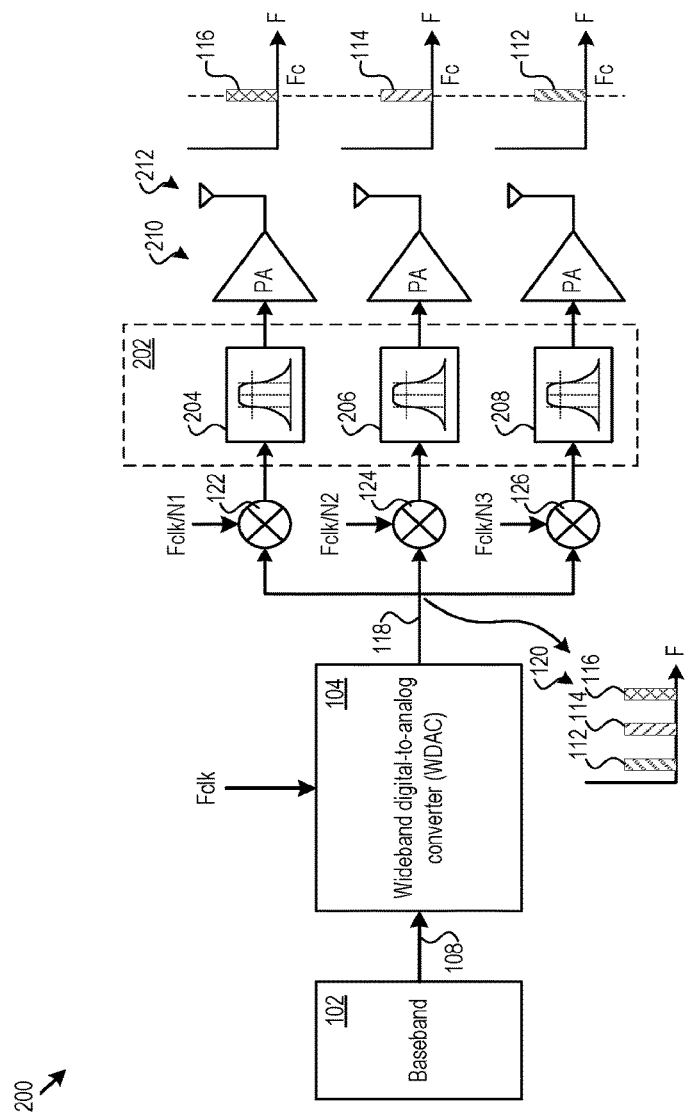
FIG. 2 shows another view of a wireless transmitter circuitry.
Figure 3:
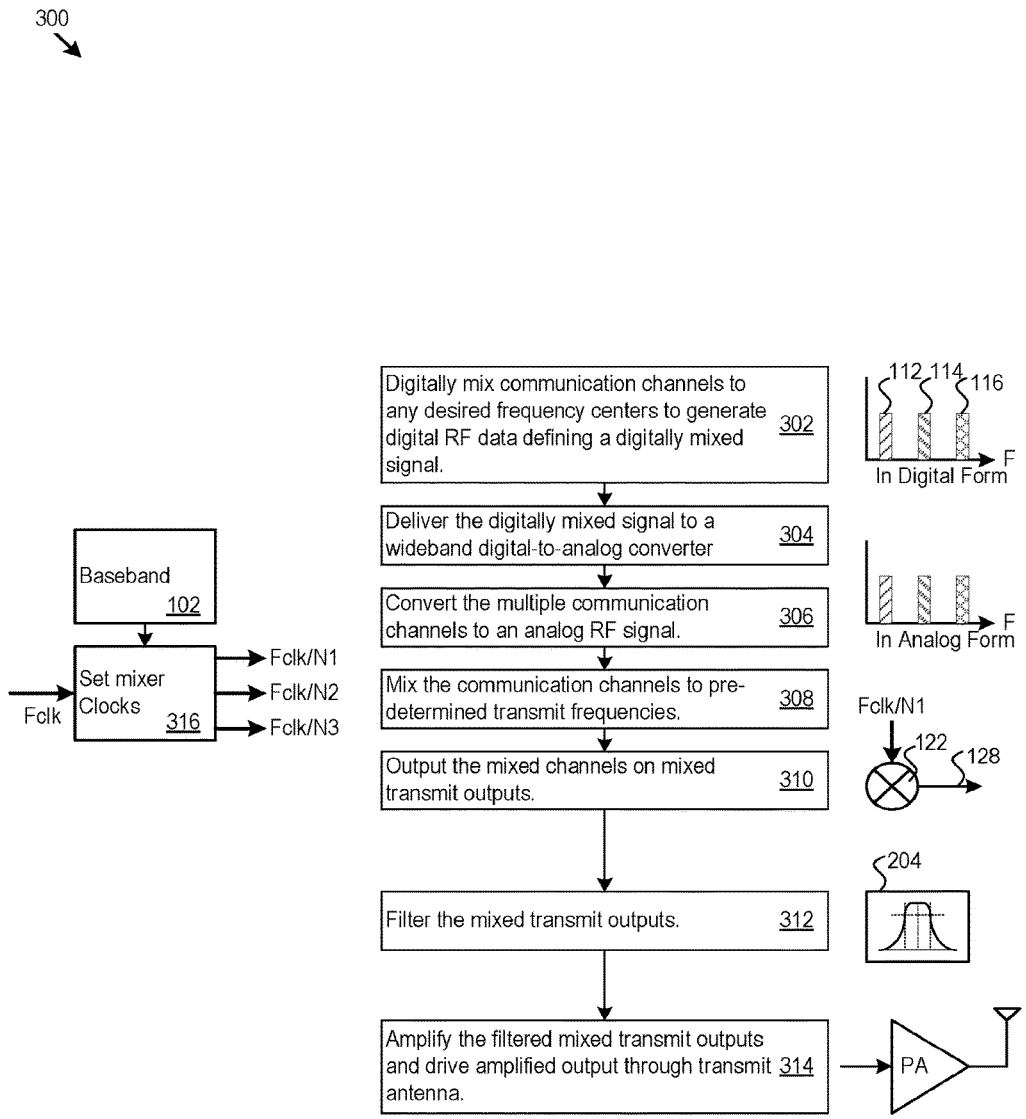
FIG. 3 shows a method for wireless transmission.

FIGS. 1 and 2 show wireless transmitter circuitry 100 and 200, and FIG. 3 shows a corresponding method for wireless transmission. In FIG. 1, the circuitry 100 includes a baseband section 102, a wideband digital-to-analog converter (WDAC) 104, and mixing circuitry 106. The baseband section 102 provides a digital transmit input 108 to the WDAC 104 that carries digital radio-frequency (RF) data defining a digitally mixed signal 110. The digital RF data of the digitally mixed signal 110 defines or includes multiple communication channels (e.g., the three channels 112, 114 and 116) spaced in frequency. There may be any number of communication channels in the digitally mixed signal 110, and each may have any pre-determined bandwidth, center frequency, and channel spacing (302).

An analog transmit output 118 carries an analog RF signal 120 corresponding to the digitally mixed signal 110 received over the digital transmit input 108 (304). The WDAC 104 generates the analog RF signal 120 from the digitally mixed signal 110. That is, the WDAC 104 performs digital to analog conversion to convert the multiple communication channels received in the digitally mixed signal 110 to analog RF channels in the analog RF signal 120 on the analog transmit output 118 (306).

The mixing circuitry 106 is configured to receive the analog RF signal 120 and move each of the communication channels 112, 114, and 116 to a predetermined center frequency. In one implementation, independent mixers 122, 124, and 126 mix the communication channels in the analog RF signal 120 to the predetermined center frequency (308) and output the resulting signal on mixed transmit outputs (e.g., the mixed transmit outputs 128, 130, and 132) (310). After filtering (312), amplifiers amplify the filtered mixed transmit outputs and drive the amplified outputs through transmit antennas (314). The center frequency for any of the communication channels may be the same or may be different. When the mixing circuitry 106 moves the communication channels to a common center frequency, the circuitry 100 may implement a N×M (e.g., 3×M) Multiple-Input Multiple-Output (MIMO) transmitter. When the mixing circuitry 106 moves the communication channels to different center frequencies, the circuitry 100 may implement a multi-channel transmitter.

Each of the mixers in the mixing circuitry 106 may be docked with a different independent clock for moving a particular analog RF channel to its destination center frequency. Control circuitry, e.g., the baseband section 102, may dynamically or statically set the mixer clocks by, e.g., setting the dock dividers for any desired transmission scenario, e.g., switching from MIMO to independent channel transmission or switching communication protocols and frequency centers (316). As shown in the Figures, the WDAC may receive a DAC clock, Folk, and the mixers may receive docks derived from Folk. That is, there may be dock generation circuitry 134, e.g., including voltage controlled oscillators, PLLs, clock dividers, or other circuitry to generate the mixer docks. In the examples below, the mixer docks are derived from Fclk by frequency division: Fclk/N1, Fclk/N2, and Fclk/N3. In other implementations, the mixer clocks may be fixed to reduce cost and complexity, with the baseband section 102 digitally mixing the communication channels to the correct intermediate center frequency in the digitally mixed signal 110 such that the fixed mixer clocks ultimately move the communication channels to the desired final center frequency for transmission.

The WDAC 104 is wideband in the sense that it has sufficient bandwidth to accurately convert the communication channels in the digitally mixed signal 110 to analog form. Expressed another way, whether a DAC is wideband may be determined by whether the DAC can convert its digital input signal to analog form while meeting a predetermined quality or distortion metric or threshold at or across one or more frequencies or frequency ranges. As another example, the wideband characteristic may be established by the WDAC bandwidth exceeding the bandwidth of the digitally mixed signal 110 by a predetermined amount (e.g., more than 2×). As yet another example, the wideband characteristic may be determined when the sample conversation rate of the DAC permits the DAC to accurately reproduce the frequency content in the digitally mixed signal 110 in analog form.

In some implementations, the communication channels are WiFi channels defined according to any of 802.11a/b/g/b/ac, and the like. For instance, under 802.11n there may be 10, 20, 40, 80, or 160 MHz wide channels at center frequencies such as 5.035 GHz (channel 7), 5.040 GHz (channel 8), 5.045 GHz (channel 9), and so on. As one example, for WiFi applications, the WDAC may have a bandwidth of up to a few GHz, e.g., 1-10 GHz, and a sampling rate of 5-15 GS/s.

Note that he communication channels in the digitally mixed signal 110 do not need to appear at their final transmit frequency centers. Instead, the baseband section 102 and the mixing circuitry 106 both influence the final frequency centers for the communication channels. As a result, the circuitry 100 has multiple degrees of freedom for placing communication channels at the desired locations.

FIG. 2 shows another example of wireless transmitter circuitry 200. As one example for 3×M MIMO operation, assume Fclk=15 GS/s and the desired common frequency center, Fc=5.5 GHz, for all three communication channels 112, 114, and 116. Then, the mixer clocks may be set to 3.00 GHz, 3.75 GHz, and 5.00 GHz. In terms of deriving the mixer clocks from Fclk, the following dividers may be used: N1=5, N2=4, and N3=3.

Table 1, below, summaries the operation of the circuitry 100 in this example.

TABLE 1

| Mixer Clocks, GHz | WDAC output: frequency centers, GHz | Mixer output, GHz |
|---|---|---|
| Mixer 122, N1 = 5 | | |
| 3.00 | 0.50 [channel 1] | 3.50 |
|  | 1.75 [channel 2] | 4.75 |
|  | 2.50 [channel 3] | 5.50 [channel 3] |
| Mixer 124, N2 = 4 | | |
| 3.75 | 0.50 [channel 1] | 4.25 |
|  | 1.75 [channel 2] | 5.50 [channel 2] |
|  | 2.50 [channel 3] | 6.25 |
| Mixer 126, N3 = 3 | | |
| 5.00 | 0.50 [channel 1] | 5.50 [channel 1] |
|  | 1.75 [channel 2] | 6.75 |
|  | 2.50 [channel 3] | 7.50 |

Note that filter circuitry 202 following the mixer circuitry suppresses frequency content other than in the channel at the desired 5.5 GHz center frequency. In the example of FIG. 2, the filter circuitry 202 includes individual band-pass filters 204, 206, and 208 around Fc. These fixed filters are characterized by a bandwidth that covers the possible different values of Fc used in a given system implementation. In that regard, the center frequencies of the filters does not depend on Fc. Accordingly, each of the filters may share a common specification, allowing cost, complexity, and implementation benefits from using the same filter in multiple transmit paths. The mixing circuitry and baseband section are jointly responsible and provide joint flexibility for placing any given communication channel of interest at a desired center frequency covered by the band-pass filters. Individual amplifiers 210 following the filters drive the communication channel out the individual antennas 212.

Figure 4:
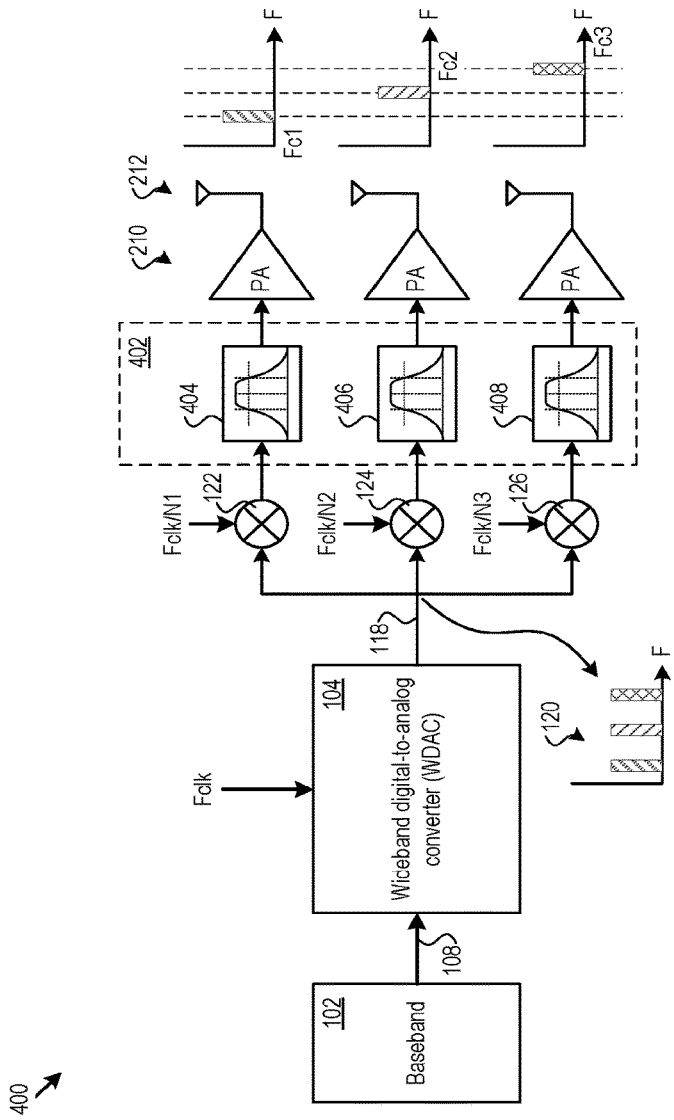
FIG. 4 shows another view of wireless transmitter circuitry.

FIG. 4 shows another view of wireless transmitter circuitry 400. In the example in FIG. 4, the single WDAC 104 generates three independent channels for transmission. Note that the mixing circuitry places the individual communication channels at different center frequencies, Fc1, Fc2, and Fc3 respectively. In this implementation identical filters may also be used because, as noted above, the filters preferably cover the range of Fc used in the system implementation. That is, identical filters may be used without the need to individually adjust the filters or provide different filters for the different center frequencies Fc1, Fc2, Fc3. In such an implementation, the baseband may implement larger channel spacing to ensure that the band-pass filters do not pass content from neighboring frequency channels, e.g., the channel spacing may be larger than the bandwidth of the band-pass filter.

Figure 5:
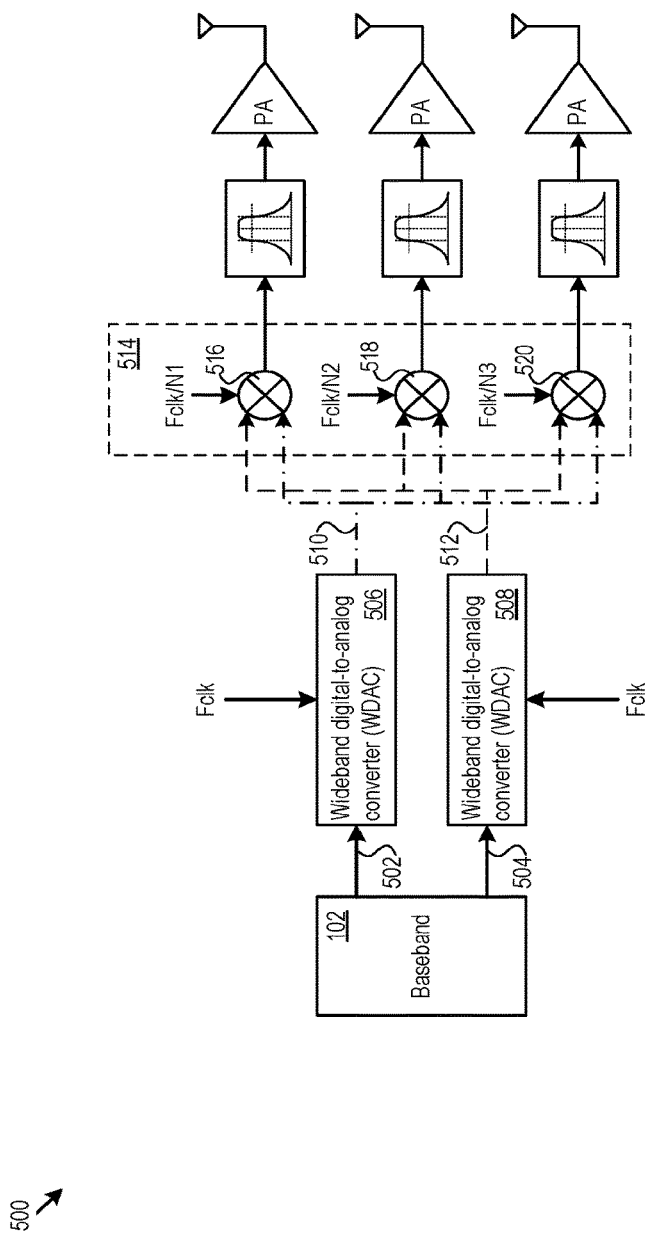
FIG. 5 shows wireless transmitter circuitry with IQ mixing.

FIG. 5 shows another implementation example, in which the wireless transmitter circuitry 500 employs IQ mixing to provide enhanced image rejection. In this example, the baseband section 102 separately outputs inphase (I) data on the I digital transmit input 502 and quadrature (Q) data on the Q digital transmit input 504. The IQ data carries digital radio-frequency (RF) data defining a digitally mixed signal, as before, with multiple communication channels.

An inphase WDAC 506 converts the I data to an I RF analog signal on the I analog transmit output 510. The quadrature WDAC 508 (clocked, e.g., at a 90° phase shift with respect to the inphase WDAC) separately converts the Q data to a RF analog signal on the Q analog transmit output 512. The mixing circuitry 514 may be implemented with quadrature mixers, e.g., image rejection (IR) or square wave mixers (e.g., the quadrature mixers 516, 518, and 520).

The wireless transmitter circuitry described above provides many technical advantages. The circuitry allows simultaneous multi-channel operation and multi-band operation, including real simultaneous dual band operation. Because the baseband section 102 implements digital mixing, WiFi and other types of signals benefit from perfect I/O matching performed in the digital domain. As other examples, the circuitry may implement a lower complexity fixed-frequency clock system for the mixers, eliminating analog frequency tuning. A single WDAC supports multiple channels simultaneously for MIMO and RSDB operation, saving circuit area and reducing power consumption.

The methods, devices, processing, circuitry, and logic described above may be implemented in many different ways and in many different combinations of hardware and software. For example, all or parts of the implementations (e.g., the baseband section 102) may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Various implementations have been specifically described. However, many other implementations are also possible.

The invention claimed is:
1. A system comprising:
 a wideband digital-to-analog converter (WDAC) configured to receive a digital radio-frequency (RF) signal, convert a plurality of communication channels in the digital RF signal to a plurality of analog RF channels, and output an analog RF signal comprising the plurality of analog RF channels; and
 a plurality of mixers coupled to the WDAC and configured to receive the analog RF signal comprising the plurality of analog RF channels, the plurality of mixers comprising:

a first mixer configured to:
   receive a first clock signal; and
   place a first analog RF channel among the plurality of analog RF channels in the analog RF signal at a first center frequency using the first clock signal; and
a second mixer configured to:
   receive a second clock signal; and
   place a second analog RF channel among the plurality of analog RF channels in the analog RF signal at a second center frequency using the second clock signal.

2. The system of claim 1, wherein the first center frequency and the second center frequency are different center frequencies.

3. The system of claim 1, wherein the first center frequency and the second center frequency are at a common center frequency.

4. The system of claim 1, wherein the WDAC is further configured to receive a digital-to-analog converter (DAC) clock signal, and the system further comprising:
   circuitry configured to derive the first clock signal and the second clock signal from the DAC clock signal.

5. The system of claim 4, wherein the circuitry is further configured to generate the first clock signal and the second clock signal by setting clock dividers.

6. The system of claim 1, further comprising:
   circuitry configured to set the first clock signal and the second clock signal statically.

7. The system of claim 1, wherein the first clock signal and the second clock signal are fixed.

8. The system of claim 1, wherein the first mixer of the plurality of mixers outputs a first resulting signal on a first transmit output, and the second mixer of the plurality of mixers outputs a second resulting signal on a second transmit output that is a separate transmit output from the first transmit output.

9. The system of claim 1, wherein the plurality of communication channels are WIFI channels defined under IEEE 802.11 specifications.

10. The system of claim 1, wherein the first center frequency and the second center frequency are between 5.001 GHz and 5.999 GHz.

11. The system of claim 1, wherein the plurality of mixers comprise individual hardware mixers individually coupled to separate transmit outputs.

12. A system comprising:
   first circuitry comprising a plurality of mixers coupled to a single wideband digital-to-analog converter (WDAC), the first circuitry configured to receive an analog radio-frequency (RF) signal comprising a plurality of communication channels from the single WDAC, wherein each mixer of the plurality of mixers is configured to receive a respective mixer clock signal and output a respective resulting signal on a separate transmit output; and
   second circuitry coupled to the first circuitry and comprising a plurality of band-pass filters on respective transmit paths, wherein the plurality of band-pass filters on the respective transmit paths are implemented as identical filters.

13. The system of claim 12, wherein a channel space of the communication channels is larger than a bandwidth of the band-pass filters.

14. The system of claim 12, wherein the plurality of mixers move the plurality of communication channels to a common center frequency.

15. The system of claim 12, wherein the plurality of mixers move the plurality of communication channels to different center frequencies.

16. The system of claim 12, further comprising:
   third circuitry configured to derive the respective mixer clock signal from a digital-to-analog converter (DAC) clock signal.

17. The system of claim 12, wherein the plurality of communication channels are WIFI channels defined under IEEE 802.11 specifications, and center frequencies of the plurality of communication channels are between 5.001 GHz and 5.999 GHz.

18. A method comprising:
   receiving, on a digital transmit input, digital radio-frequency (RF) signal including a plurality of communication channels spaced in frequency;
   converting, using a wideband digital-to-analog converter (WDAC), the plurality of communication channels received in the digital RF data to a plurality of analog RF channels in an analog RF signal on an analog transmit output; and
   mixing, using a plurality of mixers, each of the plurality of analog RF channels to a respective center frequency on different transmit outputs.

19. The method of claim 18, wherein the respective center frequency of the each of the plurality of analog RF channels is at a common center frequency.

20. The method of claim 18, wherein respective center frequencies of the plurality of analog RF channels are at different center frequencies.

* * * * *